US010059291B2

(12) United States Patent
Kishima

(10) Patent No.: US 10,059,291 B2
(45) Date of Patent: Aug. 28, 2018

(54) VEHICLE LOWER STRUCTURE

(71) Applicant: TOYOTA JIDOSHA KABUSHIKI KAISHA, Toyota-shi (JP)

(72) Inventor: Fumihiko Kishima, Konan (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/618,407

(22) Filed: Jun. 9, 2017

(65) Prior Publication Data
US 2017/0355333 A1 Dec. 14, 2017

(30) Foreign Application Priority Data
Jun. 13, 2016 (JP) ................................. 2016-117406

(51) Int. Cl.
*B62D 35/00* (2006.01)
*B62D 35/02* (2006.01)
*B60R 19/48* (2006.01)

(52) U.S. Cl.
CPC ............ *B60R 19/48* (2013.01); *B62D 35/005* (2013.01); *B62D 35/02* (2013.01); *B60R 2019/486* (2013.01); *Y02T 10/88* (2013.01)

(58) Field of Classification Search
CPC ...... B62D 35/005; B62D 35/02; B60R 19/48; B60R 19/486
USPC .............................................. 296/180.1, 208
See application file for complete search history.

(56) References Cited

U.S. PATENT DOCUMENTS

| 9,327,780 | B1* | 5/2016 | Bird ...................... B60R 19/023 |
| 9,561,827 | B2* | 2/2017 | Parry-Williams ...... B62D 37/02 |
| 9,738,331 | B2* | 8/2017 | Ito .......................... B62D 35/02 |
| 2005/0051372 | A1* | 3/2005 | Guertler ................. B60K 11/06 |
| | | | 180/68.1 |
| 2005/0161269 | A1* | 7/2005 | Khalighi .............. B62D 35/005 |
| | | | 180/116 |
| 2006/0017311 | A1* | 1/2006 | Suwa ...................... B60R 19/24 |
| | | | 296/203.02 |
| 2012/0012411 | A1* | 1/2012 | Wolf ...................... B60K 11/08 |
| | | | 180/68.1 |

(Continued)

FOREIGN PATENT DOCUMENTS

| JP | 63-111378 U | 7/1988 |
| JP | 6-65045 U | 9/1994 |

(Continued)

*Primary Examiner* — Gregory A Blankenship
(74) *Attorney, Agent, or Firm* — Oblon, McClelland, Maier & Neustadt, L.L.P.

(57) ABSTRACT

A vehicle lower structure includes: an introducing port into which air is introduced, the introducing port being provided to a front part of a vehicle; an air outlet from which the air blows, the air outlet being provided to an underfloor downward of a bumper cover in a vehicle-vertical direction, the bumper cover being located at the front part of the vehicle; and a spat provided frontward in a vehicle-longitudinal direction of a front wheel, the spat including: a front wall protruding from a front edge of the air outlet in the vehicle-longitudinal direction toward a vehicle-downward direction in the vehicle-vertical direction; and a rear wall protruding from a rear edge of air outlet in the vehicle-longitudinal direction toward the vehicle-downward direction, and the spat opening at both sides of the air outlet in a vehicle-width direction.

10 Claims, 14 Drawing Sheets

(56) References Cited

U.S. PATENT DOCUMENTS

| | | | |
|---|---|---|---|
| 2012/0024611 A1* | 2/2012 | Ajisaka | B60K 11/08 180/68.1 |
| 2015/0225026 A1* | 8/2015 | Ohira | B62D 25/08 296/180.1 |
| 2015/0274224 A1 | 10/2015 | Ito et al. | |
| 2015/0345578 A1* | 12/2015 | Nightingale | B60K 11/085 188/264 AA |
| 2016/0176385 A1* | 6/2016 | Wolf | B60T 5/00 296/208 |
| 2016/0221615 A1* | 8/2016 | Ito | B62D 35/02 |
| 2017/0057567 A1* | 3/2017 | Aoki | B62D 37/02 |
| 2017/0082092 A1* | 3/2017 | Gaither | F03D 9/32 |
| 2017/0282980 A1* | 10/2017 | Seitz | B62D 35/02 |
| 2017/0299006 A1* | 10/2017 | Shi | F16D 65/78 |
| 2017/0355333 A1* | 12/2017 | Kishima | B60R 19/48 |

FOREIGN PATENT DOCUMENTS

| | | |
|---|---|---|
| JP | 10-305786 | 11/1998 |
| JP | 3543711 | 7/2004 |
| JP | 2008-13013 A | 1/2008 |
| JP | 2014-73766 | 4/2014 |
| JP | 2014-113956 | 6/2014 |

\* cited by examiner

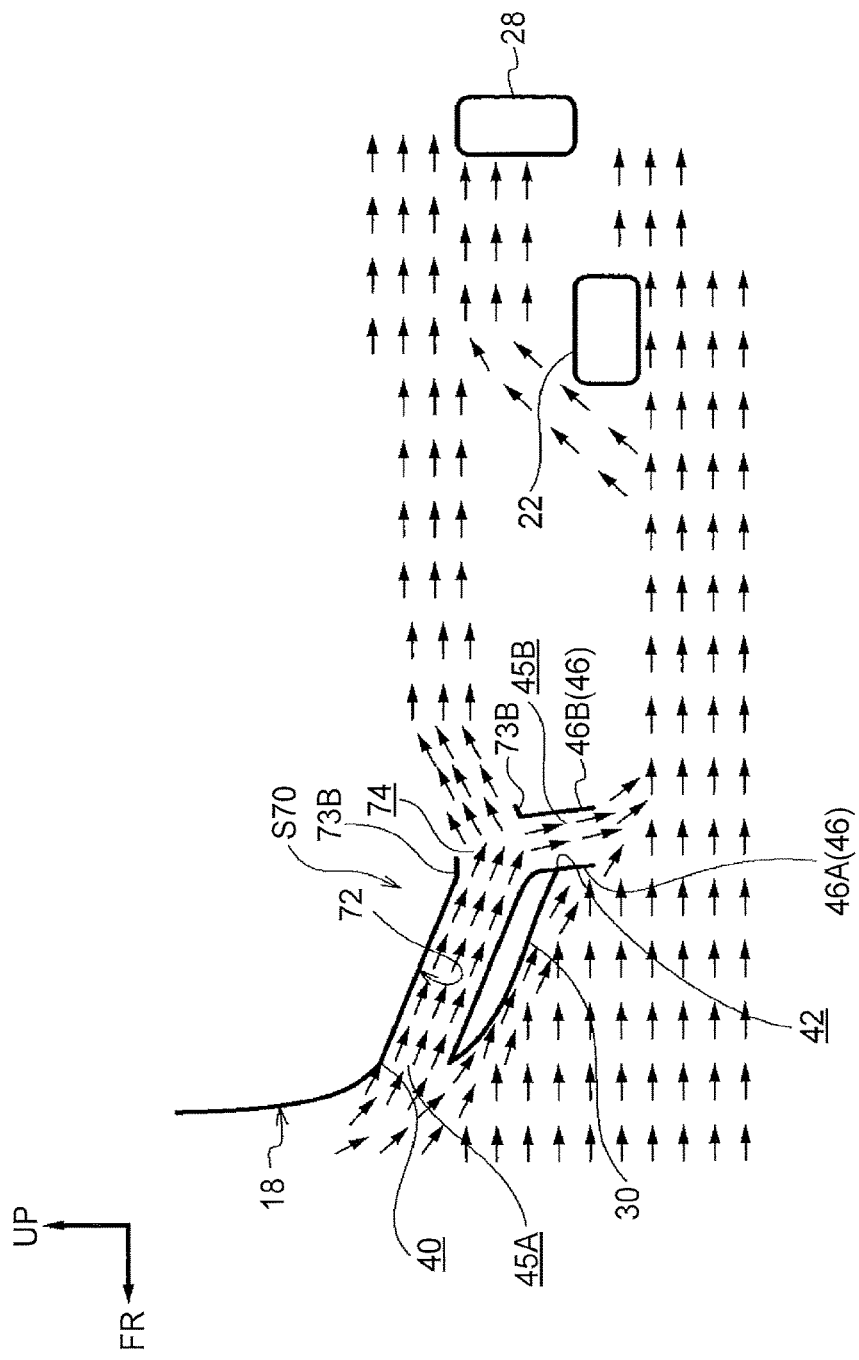

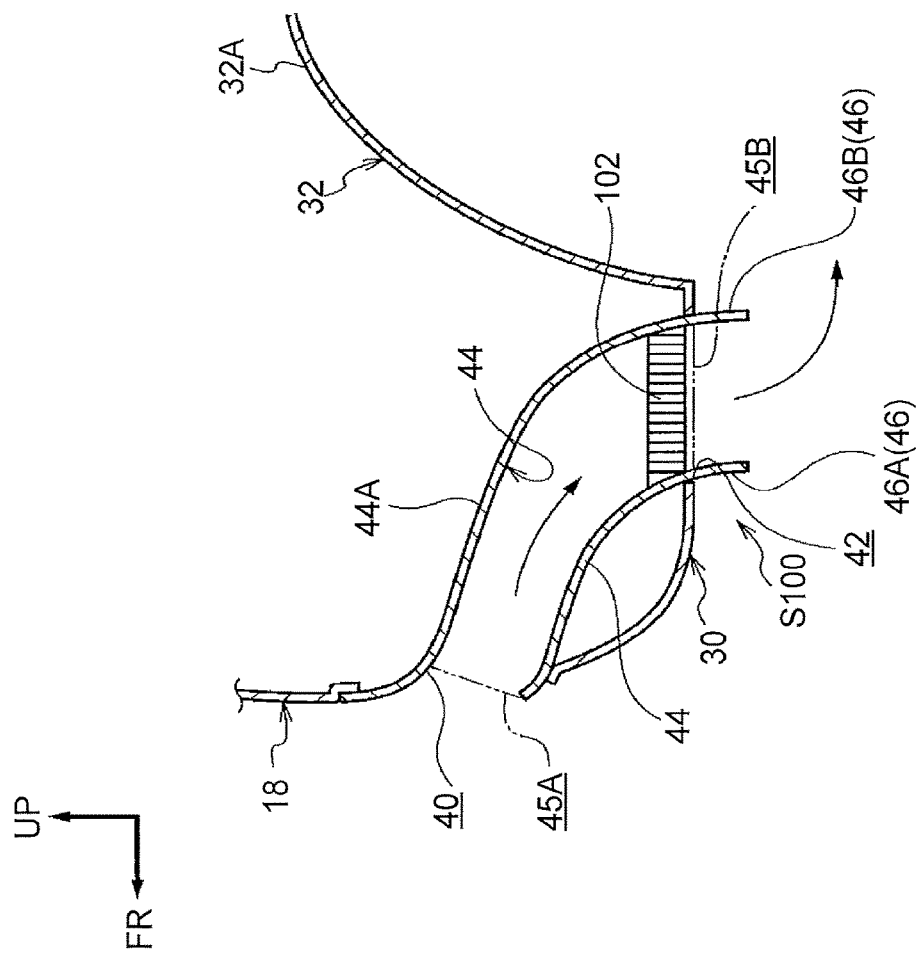

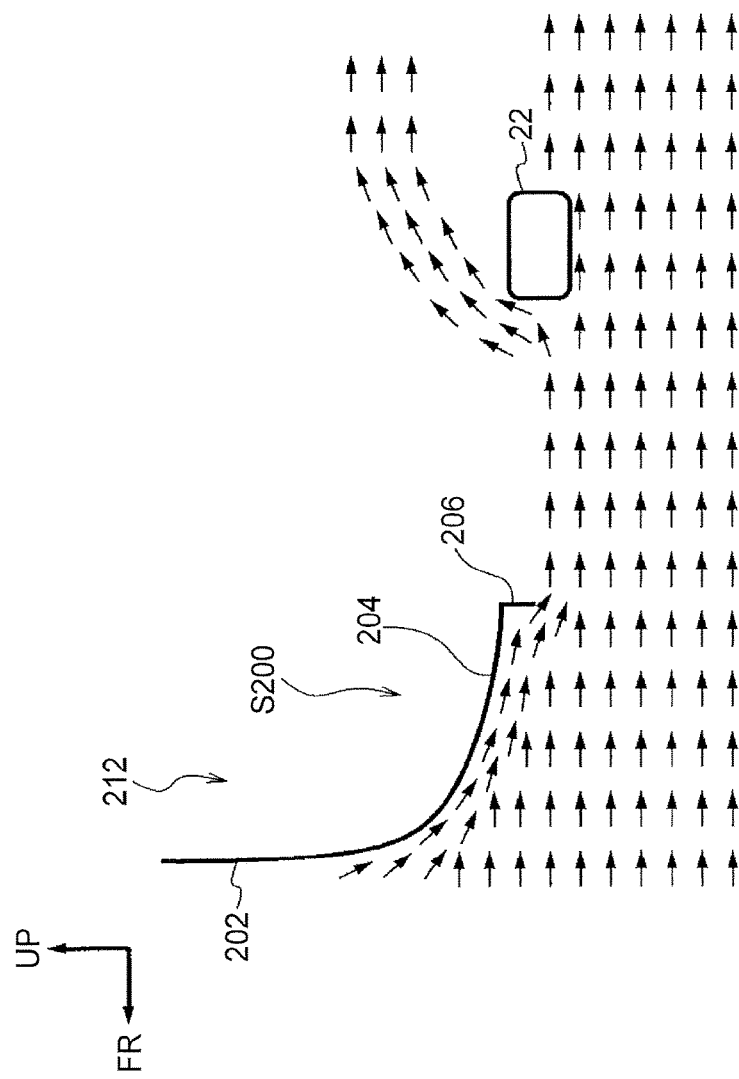

VEHICLE LOWER STRUCTURE

INCORPORATION BY REFERENCE

The disclosure of Japanese Patent Application No. 2016-117406 filed on Jun. 13, 2016 including the specification, drawings and abstract is incorporated herein by reference in its entirety.

BACKGROUND

1. Technical Field

The present disclosure relates to a vehicle lower structure.

2. Description of Related Art

Japanese Patent Application Publication No. 10-305786 discloses a configuration of including ducts that connect introducing ports provided to a front face of a bumper cover of a vehicle front part and outlet apertures provided to a floor wall at a lower part of the bumper cover, and bringing air introduced from the introducing ports to blow from the outlet apertures toward a vehicle-downward direction.

Japanese Patent Application Publication No. 2014-073766 discloses a configuration of including ducts that connect introducing ports provided to a front face of a bumper cover in a vehicle front part and outlet apertures (outlet ports) provided to an undercover in a lower part of the bumper cover, and also including spats protruding from the undercover located at a vehicle-rearward position of the outlet apertures toward the vehicle-downward direction. An inclined portion inclined toward the vehicle-rearward direction is provided at an outer end of each spat in the vehicle-width direction so that the air blowing from the outlet aperture of each duct is brought to flow along the inclined portion toward each side (outward in the vehicle-width direction) of the vehicle.

Japanese Patent No. 3543711 discloses a configuration of providing a front end of a fender liner located frontward of each front wheel with a cylindrical spat which protrudes toward the vehicle-downward direction and whose four sides are surrounded by walls, and also providing the spats at lower ends thereof with air outlets from which the air blows.

SUMMARY

In the configuration described in JP 10-305786 A, part of the air blowing from the outlet aperture of each duct collides with air flowing from frontward of the vehicle, so that the air flow might be stopped, and thus cannot blow toward the vehicle-downward direction. In the configuration described in JP 2014-073766 A, part of air blowing from the outlet aperture of each duct collides with air flowing from frontward of the vehicle, so that the air flow might be stopped, and thus cannot blow toward the vehicle-downward direction.

In the configuration described in JP Patent No. 3543711, each spat protruding toward the vehicle-downward direction has a cylindrical shape whose four sides are surrounded by walls; thus, pressure loss becomes greater, and an air flow rate might become decreased.

The present disclosure provides a vehicle lower structure capable of efficiently guiding an air flow blowing from an air outlet of each duct toward the vehicle downward direction.

A first aspect of the disclosure provides a vehicle lower structure. The first aspect includes: an introducing port into which air is introduced, the introducing port being provided to a front part of a vehicle; an air outlet from which the air blows, the air outlet being provided to an underfloor downward of a bumper cover in a vehicle-vertical direction, the bumper cover being located at the front part of the vehicle; and a spat provided frontward in a vehicle-longitudinal direction of a front wheel, the spat including: a front wall protruding from a front edge of the air outlet in the vehicle-longitudinal direction toward a vehicle-downward direction in the vehicle-vertical direction; and a rear wall protruding from a rear edge of air outlet in the vehicle-longitudinal direction toward the vehicle-downward direction, and the spat opening at both sides of the air outlet in a vehicle-width direction.

According to the above aspect, the vehicle lower structure is provided with the introducing port disposed to the front part of the vehicle and the air outlet disposed to the underfloor located downward in the vehicle-vertical direction of the bumper cover. Through this, the air introduced from the introducing port at the front part of the vehicle is brought to blow from the air outlet of the underfloor toward the vehicle-downward direction. At this time, the spat is provided frontward of the front wheel in the vehicle-longitudinal direction, and the spat includes the front wall protruding from the front edge of the air outlet toward the vehicle-downward direction, and the rear wall protruding from the rear edge of the air outlet toward the vehicle-downward direction. Accordingly, the air flow blowing from the air outlet flows along the front wall at the front of the air outlets and the rear wall at the back of the air outlet toward the vehicle-downward direction. In addition, the front wall at the front of the air outlet suppress disturbance of the air flow blowing from the air outlet, which is caused by the air flow flowing from frontward of the vehicle. Furthermore, the spat is configured to open at both sides of the air outlet in the vehicle-width direction, and thus has a smaller pressure loss, compared with a configuration of providing cylindrical spat in which four sides of each air outlet are surrounded by walls; therefore, decrease in flow rate of the air is suppressed. Hence, it is possible to efficiently guide the air blowing from the air outlet toward the vehicle-downward direction.

In the first aspect, the spat may be composed of an elastic platy member that is elastically deformable.

According to the above aspect, for example, when the spat collide with protrusions such as curbstones, the front wall and the rear wall of the spat are elastically deformed so that they can easily return to original shapes thereof. Hence, it is possible to suppress breakage of the spat. Accordingly, it is possible to lower the positions the spat in the vehicle-downward direction, thus effectively guiding the air toward the downward direction.

In the first aspect, at least one of the front wall and the rear wall may have a longitudinal direction thereof in the vehicle-vertical direction, and may include multiple projections projecting toward an inside of the air outlet in a vehicle plan view.

According to the above aspect, when the air blows downward from the air outlet, longitudinal vortexes are caused by the multiple projections. Hence, it is possible to add a longitudinal vortex component having a high straightness to the downward air flow, thereby allowing the air to blow from the air outlet farther toward the vehicle-downward direction.

The first aspect may include a duct which connects the introducing port and the air outlet.

According to the above aspect, compared with a configuration of not connecting the introducing port and the air outlet by the duct, the internal pressure in the duct becomes higher, and thus the air can easily flow from the air outlet to the outside.

In the above aspect, a wall part located at a rearward position of the duct in the vehicle-longitudinal direction may be provided with an aperture arranged frontward in the vehicle-longitudinal direction of a brake device of the front wheel, the aperture being configured to exhaust the air in the duct toward the brake device.

According to the above aspect, the air in the duct is exhausted from the aperture toward the brake device, thereby cooling the brake device with the air exhausted from the aperture. In addition, it is possible to exhaust the air toward the brake device without bring the air to collide with a chassis arm.

In the first aspect, the air outlet may be provided to an undercover disposed downward of the bumper cover in the vehicle-vertical direction in such a manner as to open downward in the vehicle-vertical direction.

In the above aspect, the spat may be integrated with the undercover.

In the first aspect, when a duct is provided, a radiator may be provided in the duct.

In the first aspect, the front wall and the rear wall may be inclined relative to the vehicle-vertical direction toward a vehicle-rearward direction within a range of not less than 0° to not more than 45°.

A second aspect of the disclosure provides a vehicle lower structure. The second aspect includes: an introducing port opening toward a vehicle-frontward direction in a bumper cover provided to a front part of a vehicle; an air outlet opening downward in a vehicle-vertical direction in an undercover disposed downward in the vehicle-vertical direction of the bumper cover; and a spat protruding downward in the vehicle-vertical direction from the air outlet, the spat including a front wall protruding from a front edge of the air outlet in a vehicle-longitudinal direction toward a vehicle-downward direction in the vehicle-vertical direction and a rear wall protruding from a rear edge of the air outlet in the vehicle-longitudinal direction toward the vehicle-downward direction, and the spat being configured to open at both sides of the air outlet in a vehicle-width direction.

The second aspect may include a duct which connects the introducing port and the air outlet, a wall part of the duct located at a rearward position in the vehicle-longitudinal direction being provided with an aperture arranged frontward of a brake device of a front wheel in the vehicle-longitudinal direction.

According to the vehicle lower structures of the above aspects of the present disclosure, the air flow blowing from the air outlets of the duct can effectively be guided toward the vehicle-downward direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a side view schematically showing an air flow in the vehicle lower structure as shown in FIG. 7;

FIG. 11 is a sectional side view showing a vehicle lower structure according to a fifth embodiment;

FIG. 14 is a side view schematically showing an air flow in a vehicle lower structure of a comparative example.

DETAILED DESCRIPTION OF EMBODIMENTS

Vehicle lower structures according to embodiments of the present disclosure will be described with reference to drawings. It should be noted that respective arrows appropriately shown in these drawings are defined such that an arrow FR indicates a vehicle-frontward direction, an arrow UP indicates a vehicle-upward direction, and an arrow OUT indicates a direction outward of a vehicle-width direction, respectively. Hereinafter, if description is provided by simply using front and rear, left and right, and upward and downward directions, these indicate frontward and rearward sides in the vehicle longitudinal direction, right and left sides of the vehicle right-left directions (vehicle-width direction), and upward and downward sides of the vehicle vertical direction, respectively, unless otherwise noted.

[First Embodiment]

Figure 1:
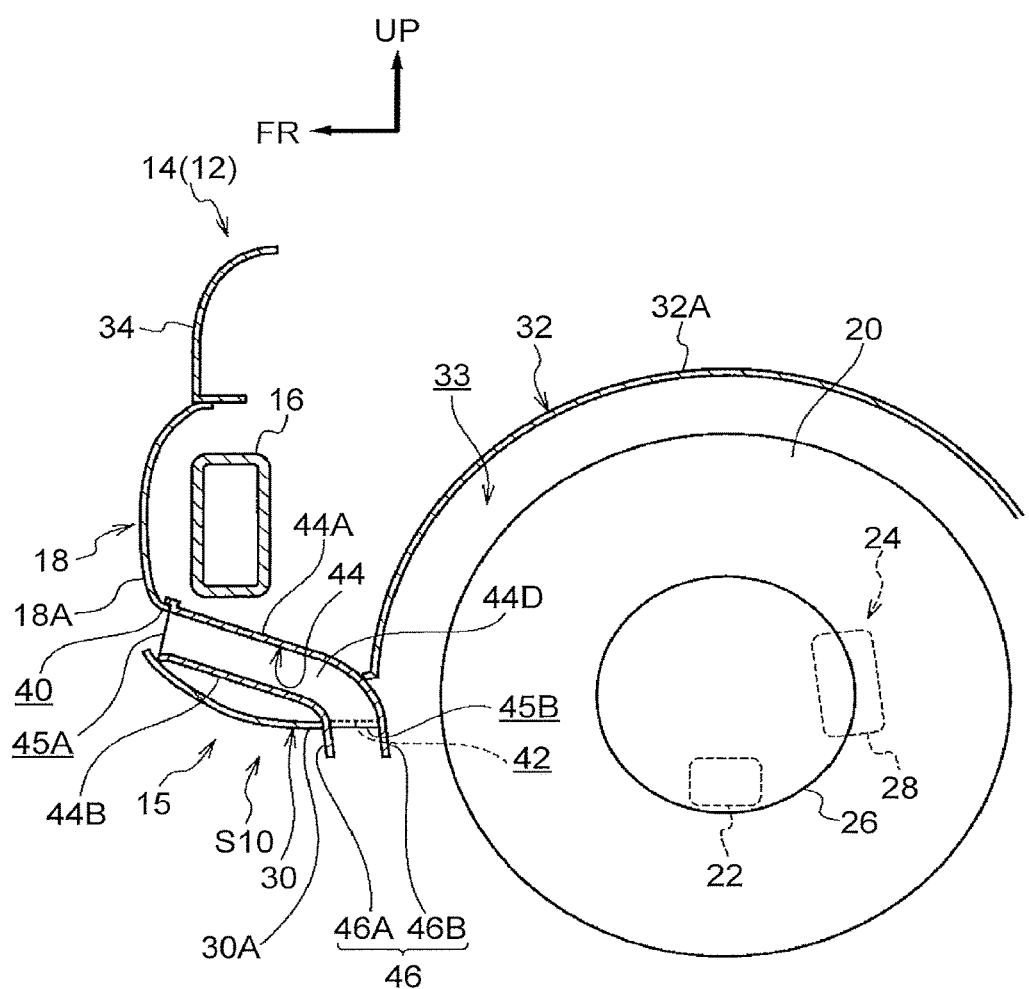
FIG. 1 is a sectional side view showing a vehicle lower structure according to a first embodiment.
Figure 2:
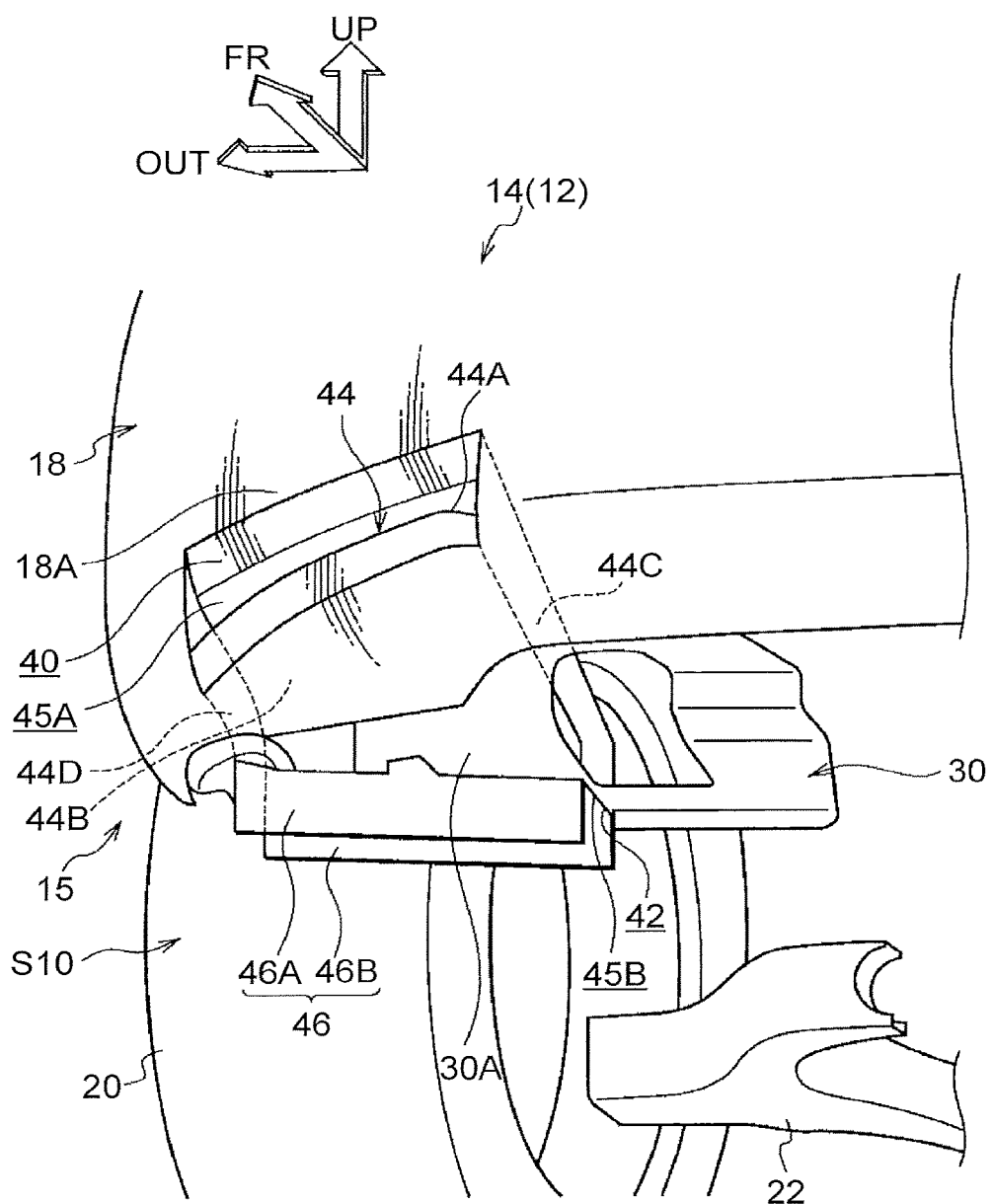
FIG. 2 is a perspective view showing a state of the vehicle lower structure in FIG. 1 as viewed from an obliquely front lower direction of the vehicle.
Figure 3:
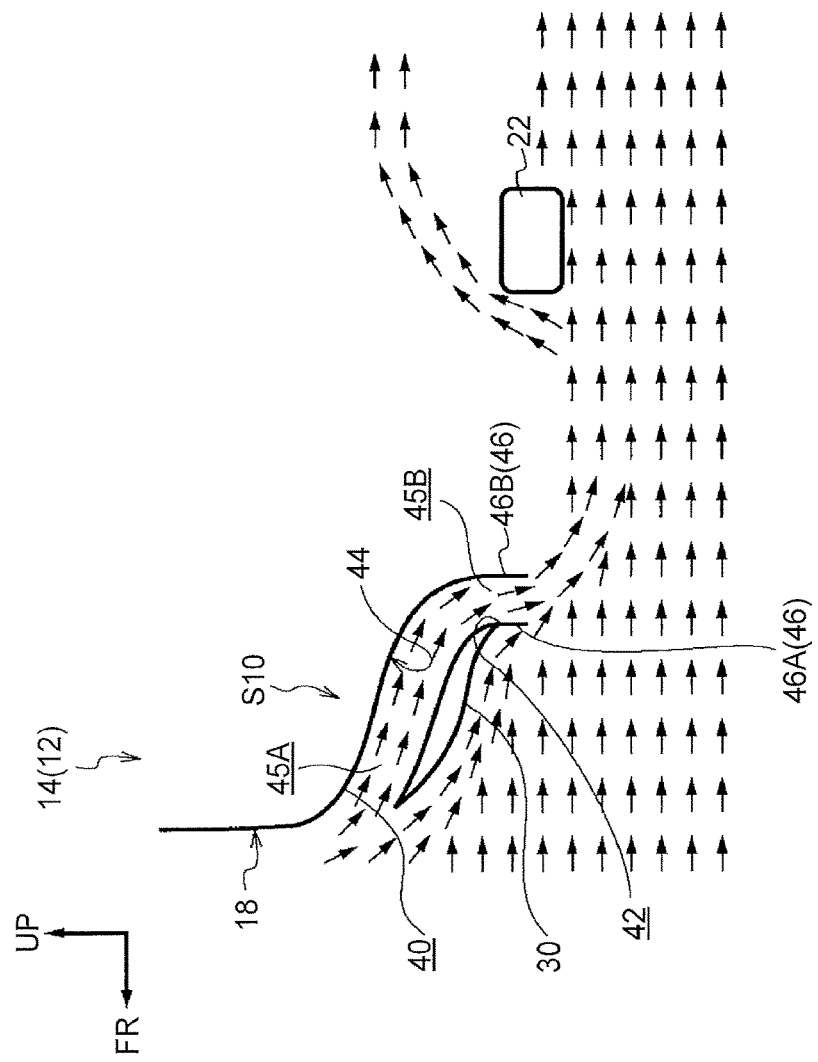
FIG. 3 is a side view schematically showing an air flow of the vehicle lower structure as shown in FIG. 1.

With reference to FIG. 1 to FIG. 3, a vehicle lower structure of the first embodiment according to the present disclosure will be described, hereinafter.

FIG. 1 is a sectional side view showing a front part 14 of a vehicle 12 to which the vehicle lower structure S10 of the first embodiment is applied. FIG. 2 is a perspective view showing a lower part 15 at one end of the front part 14 of the vehicle 12 in the vehicle width-direction (right end in the vehicle-width direction in a back side view of the vehicle) to which the vehicle lower structure S10 is applied, as viewed from an obliquely front lower direction of the vehicle. In FIG. 2, it should be noted that the other end of the front part 14 in the vehicle-width direction (left end in the vehicle-width direction in the vehicle back side view) is right-left symmetric, and thus an illustration thereof will be omitted. As shown in FIG. 1, a bumper reinforcement 16 extending substantially in the vehicle-width direction is provided to the front part 14 of the vehicle 12 of the present embodiment. The bumper reinforcement 16 is a vehicle frame member that is formed in a substantially rectangular shape in the sectional side view and has a substantially vehicle-width direction as a longitudinal direction thereof. The bumper reinforcement 16 is combined to front ends of a pair of right and left front side members (not shown in the drawing) extending substantially along the vehicle-longitudinal direction. A bumper cover 18 made of resin extending substantially in the vehicle-width direction is provided to a front part of the bumper reinforcement 16 in the vehicle-longitudinal direction (see FIG. 2).

As shown in FIG. 1 and FIG. 2, a front wheel 20 is disposed outward in the vehicle-width direction of each front side member (not shown in the drawings). Each front wheel 20 is supported by a suspension arm (chassis arm) 22 extending outward in the vehicle-width direction from the front side member (not shown in the drawings). As shown in FIG. 1, the front wheel 20 is provided with a brake device 24. The brake device 24 includes a disk rotor 26 fixed to a rim of the front wheel 20, and a brake caliper 28 disposed on an outer circumference of the disk rotor 26 and coming into contact with the disk rotor 26 so as to apply braking force to the disk rotor 26. In a vehicle sectional side view, the brake caliper 28 is disposed at an obliquely upper rearward position in the vehicle-vertical direction from the suspension arm 22, and located at a vehicle-rearward position from a rotational center of the front wheel 20.

As shown in FIG. 1, an undercover 30 made of resin is provided downward in the vehicle-vertical direction of the bumper cover 18 with the substantially vehicle-width direction as a longitudinal direction thereof (see FIG. 2). In the sectional side view, the undercover 30 extends from a lower end in the vehicle-vertical direction of the bumper cover 18 toward substantially the vehicle-rearward direction, and composes an underfloor of the front part 14 of the vehicle 12. Although not illustrated in the drawing, the undercover 30 is fastened to the bumper cover 18 with fasteners such as bolts. A fender liner 32 is arranged rearward of the undercover 30 in the vehicle-longitudinal direction in such a manner as to cover an intermediate part to an upper part of the front wheel 20 from above of the vehicle. The fender liner 32 is disposed radially outward of the front wheel 20, and includes an arch portion 32A in a substantially half-cylindrical shape opening toward a vehicle-downward direction. Specifically, a wheel house 33 as a space where the front wheel 20 is disposed is defined by the arch portion 32A. A front lower end of the fender liner 32 is joined to a rear end of the undercover 30 with fasteners or the like. Head lamps 34 are disposed above both ends of the bumper cover 18 in the vehicle-width direction.

As shown in FIG. 1 and FIG. 2, an introducing port 40 into which the air is introduced is provided to each end 18A of a front face of the bumper cover 18 in the vehicle-width direction. The introducing port 40 is disposed at a lower part in the vehicle-vertical direction of the bumper cover 18. In the present embodiment, the introducing port 40 is formed in a substantially rectangular shape having a longer length in the vehicle-width direction than a length in the vehicle-vertical direction (see FIG. 2). The bumper cover 18 has such a shape that both ends 18A in the vehicle-width direction are curved toward the vehicle-rearward direction from a center part of the bumper cover 18 in the vehicle-width direction, and at least a part of the introducing port 40 that is located outward in the vehicle-width direction is located in the curved part of the bumper cover 18. A lower part in the vehicle-vertical direction of the bumper cover 18 is formed in a shape curved in the vehicle-downward direction and the vehicle-rearward direction toward a position where the undercover 30 is disposed (see FIG. 2). The undercover 30 is provided with air outlets 42 from which the air blows. Each air outlet 42 is disposed to a rear part 30A of the undercover 30. In the present embodiment, the air outlet 42 is formed in a substantially rectangular shape having a longer length in the vehicle-width direction than a length in the vehicle-longitudinal direction.

In addition, a duct 44 connecting each corresponding introducing port 40 and each corresponding air outlet 42 is provided between the bumper cover 18 and the undercover 30 in the lower part 15 of the vehicle 12. Each duct 44 includes a cylindrical portion in a substantially rectangular shape. More specifically, each duct 44 includes an upper wall 44A disposed at an upper position in the vehicle-vertical direction, a lower wall 44B that faces the upper wall 44A and is disposed at a lower position in the vehicle-vertical direction, and a pair of side walls 44C, 44D so disposed as to connect the upper wall 44A and the lower wall 44B, respectively (see FIG. 2). A front aperture 45A is formed at a front end of the duct 44 in the vehicle-longitudinal direction, and a rear aperture 45B is formed at a rear end of the duct 44 in the vehicle-longitudinal direction.

The front aperture 45A of the duct 44 is connected to the introducing port 40 of the bumper cover 18. In the present embodiment, the introducing port 40 of the bumper cover 18 is formed by wall faces curved toward the vehicle-rearward direction, and an edge of the front aperture 45A of the duct 44 is fixed to these wall faces (see FIG. 1). The rear aperture 45B of the duct 44 is connected to the air outlet 42 of the undercover 30. In the present embodiment, the edge of the rear aperture 45B of the duct 44 is fixed to an edge of the air outlet 42 of the undercover 30 in a state in which the rear aperture 45B of duct 44 is inserted in the air outlet 42 of the undercover 30, (see FIG. 1).

In the vehicle sectional side view, the duct 44 is arranged such that an intermediate part, in the vehicle-longitudinal direction, to a front end (a part on the front aperture 45A side) of the duct 44 extends substantially straight from the introducing port 40 toward a vehicle-rearward and obliquely-downward direction, and a rear end (a part on the rear aperture 45B side) of the duct 44 in the vehicle-longitudinal direction is curved in the vehicle-downward direction toward the air outlet 42. In the vehicle lower structure S10, the air introduced from the introducing port 40 flows through the duct 44, and is then brought to blow from the air outlet 42.

A spat 46 protruding from the undercover 30 toward the vehicle-downward direction is provided at the front and the back of each air outlet 42 in the undercover 30. The spat 46 is located frontward of each front wheel 20 in the vehicle-longitudinal direction. More specifically, the spat 46 includes a front wall 46A protruding from a front edge in the vehicle-longitudinal direction of the air outlet 42 in the vehicle-longitudinal direction in the undercover 30, and a rear wall 46B protruding from a rear edge in the vehicle-longitudinal direction of the air outlet 42 in the vehicle-longitudinal direction in the undercover 30. Each spat 46 is configured to open at both sides of the air outlet 42 in the vehicle-width direction. The front wall 46A and the rear wall 46B are composed of platy members, and are arranged with a distance therebetween at the front and the back of the air outlet 42, respectively. In the present embodiment, each of the front wall 46A and the rear wall 46B is formed in a substantially rectangular shape in a vehicle front view.

As shown in FIG. 1, the front wall 46A of the spat 46 is so integrally formed as to be continued to the lower wall 44B of the duct 44, and the rear wall 46B of the spat 46 is so integrally formed as to be continued to the upper wall 44A of the duct 44. Specifically, in the present specification, "from the front edge of the air outlet 42 in the vehicle-longitudinal direction" also includes a configuration of integrating the front wall 46A of the spat 46 with the duct 44 at the front edge of the air outlet 42. Each spat 46 may be configured as a separate member from the duct 44. For example, the front wall 46A may be fixed to the lower wall 44B of the duct 44 or the undercover 30 with fixing tools, or the rear wall 46B may be fixed to the upper wall 44A of the duct 44 or the undercover 30 with fixing tools.

Operation and effect of the vehicle lower structure S10 of the present embodiment will be described, hereinafter.

As shown in FIG. 1 and others, in the vehicle lower structure S10, there are provided the ducts 44, each connecting each corresponding introducing port 40 provided to the front face of the bumper cover 18 in the front part 14 of the vehicle 12 and each corresponding air outlet 42 provided to the undercover 30 composing the underfloor located downward in the vehicle-vertical direction of the bumper cover 18. In the present embodiment, the front aperture 45A of the duct 44 is connected to the introducing port 40 of the bumper cover 18, and the rear aperture 45B of the duct 44 is connected to the air outlet 42 of the undercover 30. The spat 46 is disposed at the front and the back of the air outlet 42 in the undercover 30 at a frontward position of each front wheel 20 in the vehicle-longitudinal direction. Each spat 46 includes the front wall 46A protruding toward the vehicle-downward direction from the front edge of the air outlet 42 in the vehicle-longitudinal direction in the undercover 30, and the rear wall 46B protruding toward the vehicle-downward direction from the rear edge in the vehicle-longitudinal direction of the air outlet 42 in the undercover 30. Each spat 46 is configured to open at both the sides of the air outlet 42 in the vehicle-width direction.

FIG. 3 is a schematic sectional side view showing the air flow in the vehicle lower structure S10. As shown in FIG. 3, in the vehicle lower structure S10, the air is introduced from the introducing port 40 in the front face of the bumper cover 18 into the duct 44, and the air flows through the inside of the duct 44 toward the rearward direction. Furthermore, the air having flowed through the duct 44 is then brought to blow from the air outlet 42 of the undercover 30 composing the underfloor (the rear aperture 45B of the duct 44 disposed in the air outlet 42 of the undercover 30 in the present embodiment) toward the vehicle-downward direction. At this time, at a frontward position of each front wheel 20, there is provided the spat 46 including the front wall 46A and the rear wall 46B that protrude from the front and the rear edges of the air outlet 42 in the undercover 30 toward the vehicle-downward direction. With this, the air flow blowing from the air outlet 42 flows along the front wall 46A at the front of the air outlet 42 and the rear wall 46B at the back of the air outlet 42 toward the vehicle-downward direction, as indicated by arrows in FIG. 3. In addition to this, the front wall 46A at the front of the air outlet 42 suppresses disturbance of the air flow blowing from the air outlet 42, which is caused by the air flow flowing from frontward of the vehicle 12. Here, the air flow blowing from the air outlet 42 will be more specifically explained in comparison with several configurations.

In the vehicle lower structure S10 of the present embodiment, the introducing port 40 and the air outlet 42 are connected by the duct 44, and internal pressure in the duct 44 becomes higher compared with the configuration of not connecting the introducing port and the air outlet by the duct; thus the air can easily flow from the air outlet 42 to the outside.

In addition, for example, in a configuration of connecting the introducing port and the air outlet and providing no spat to the edge of the air outlet of the duct, the outside of the air outlet of the duct is covered by the air flow flowing from frontward of the vehicle, so that the pressure becomes higher; consequently, the flow rate of the air flow inside the duct might become decreased. In addition, the air exhausted from the air outlet of the duct might be pushed by the air flow flowing from frontward of the vehicle, so that the air flow might flow toward the vehicle-rearward direction. To the contrary, in the vehicle lower structure S10 of the present embodiment, the front wall 46A and the rear wall 46B are provided at the front and the back of the air outlet 42, thus suppressing increase in pressure in the outside of the air outlet 42. That is, the air flow blowing from the air outlet 42 can easily flow along the front wall 46A at the front of the air outlet 42 and the rear wall 46B at the back of the air outlet 42 toward the vehicle-downward direction. In addition, the front wall 46A at the front of the air outlet 42 suppresses disturbance of the air flow blowing from the air outlet 42, which is caused by the air flow flowing from frontward of the vehicle 12.

For example, in a configuration of including cylindrical spats with air outlets, each having four sides surrounded by walls, pressure loss becomes greater, and thus the flow rate of the air might become decreased. To the contrary, in the vehicle lower structure S10 of the present embodiment, each of the spats 46 is configured to open at both the sides of each air outlet 42 in the vehicle-width direction, thus suppressing decrease in flow rate of the air because the pressure loss becomes smaller, compared with the configuration of including the cylindrical spats with the air outlets, each having four sides surrounded by walls. In addition, each of the spats 46 is opened at both the sides of the air outlet 42 in the vehicle-width direction, and thus shear force of the air flow exhausted from the air outlet 42 of the duct 44 is utilized to accelerate the air flow at the side surfaces of the spat 46 (on both the sides of the air outlet 42 in the vehicle-width direction) toward the downward direction. As a result, it is possible to efficiently guide the air blowing from the air outlet 42 toward the vehicle-downward direction.

Accordingly, as indicated by arrows in FIG. 3, the air flow flowing from each air outlet 42 toward the suspension arm 22 located at a vehicle-rearward position becomes reduced, thereby reducing air resistance of the vehicle 12.

FIG. 14 is a schematic sectional side view showing an air flow in a vehicle lower structure S200 of a comparative example. As shown in FIG. 14, in the vehicle lower structure S200 of the comparative example, there is provided an undercover 204 composing an underfloor located downward in the vehicle-vertical direction of a bumper cover 202. A single spat 206 protruding from a lower face of the undercover 204 toward the vehicle-downward direction is provided to a rear part of the undercover 204 in the vehicle-longitudinal direction.

In the vehicle lower structure S200 of the comparative example, as indicated by arrows in FIG. 14, the air flowing from frontward of a vehicle 212 flows over the spat 206 straightly toward the vehicle-rearward direction. Hence, the air flow is likely to collide with the suspension arm 22, and thus air resistance received by the vehicle 12 becomes greater.

To the contrary, in the vehicle lower structure S10 of the present embodiment, the front wall 46A of the spat 46 at the front of the air outlet 42 suppresses disturbance of the air flow blowing from the air outlet 42, which is caused by the air flow flowing from frontward of the vehicle 12, thereby efficiently guiding the air blowing from the air outlet 42 toward the vehicle-downward direction. Hence, in the vehicle lower structure S10 of the present embodiment, compared with the vehicle lower structure S200 of the comparative example, it is possible to significantly reduce the air flow flowing from the air outlet 42 toward the suspension arm 22 located at a vehicle-rearward position, thus reducing the air resistance received by the vehicle 12.

[Second Embodiment]

Figure 4:
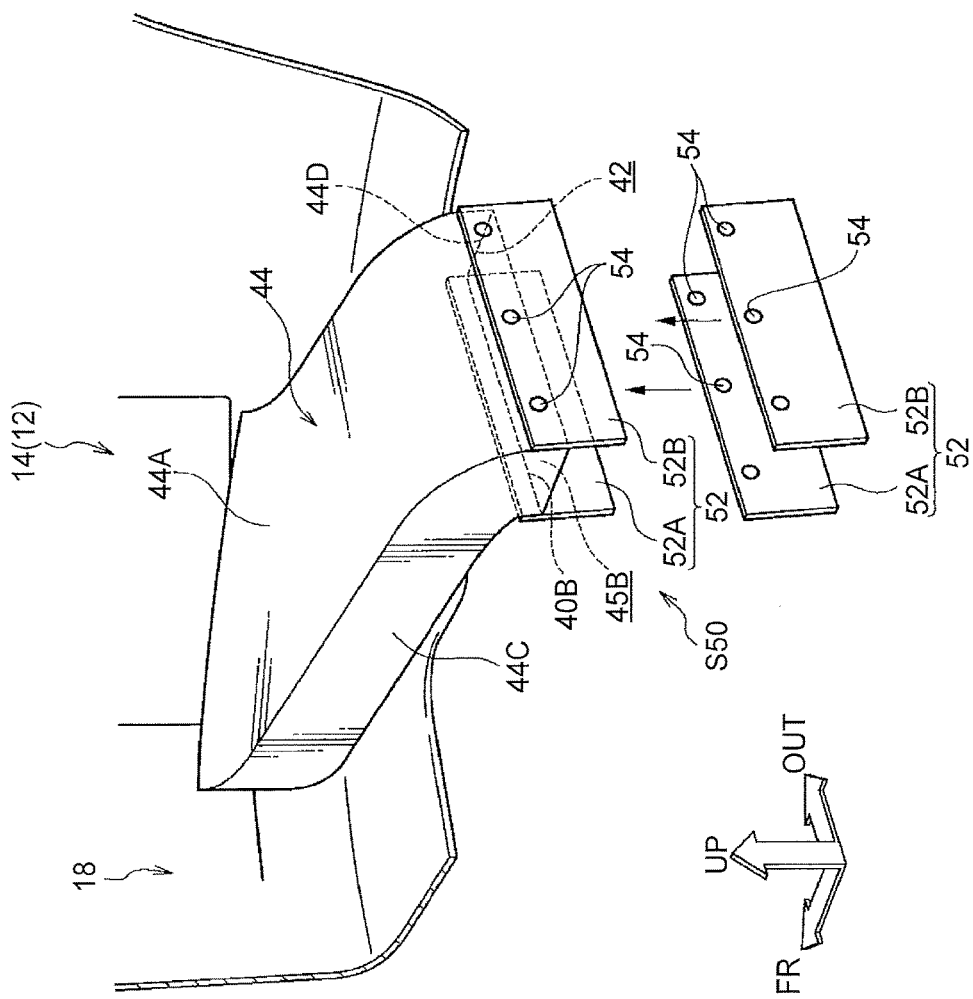
FIG. 4 is a partially-broken perspective view showing a duct and a spat provided to a vehicle lower structure according to a second embodiment, as viewed from a vehicle rearward direction.
Figure 5:
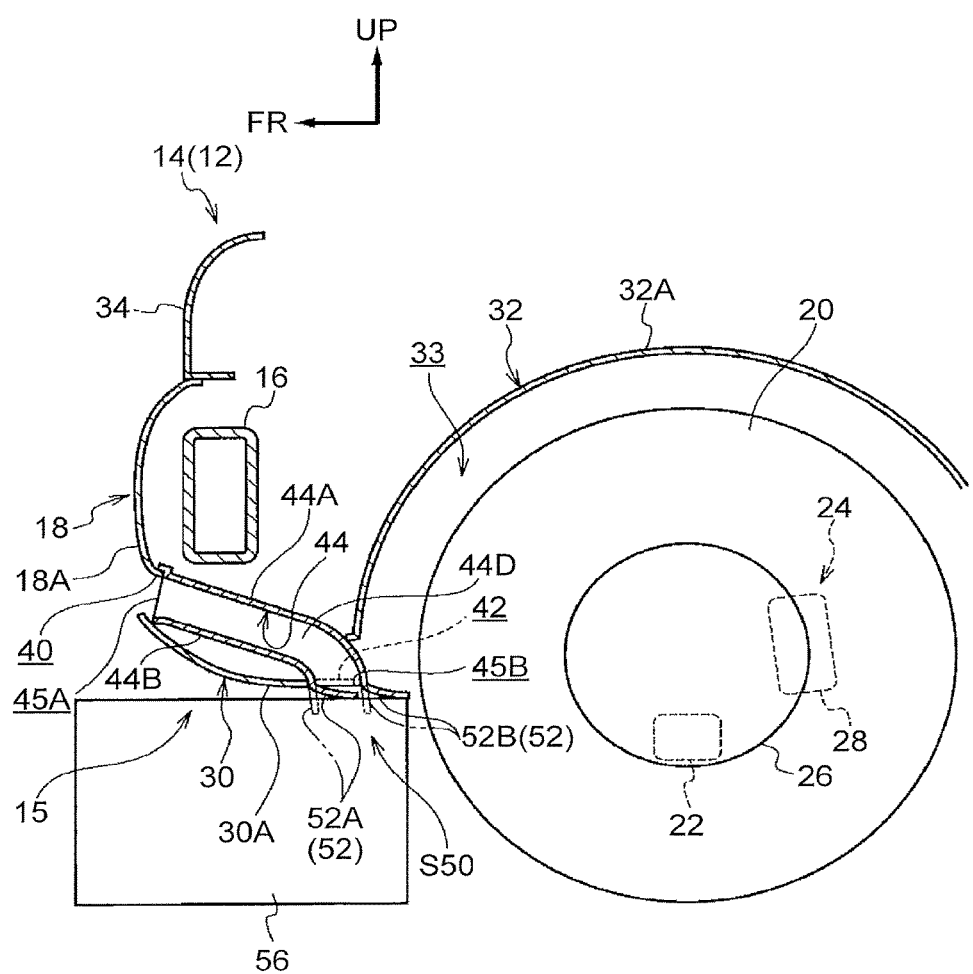
FIG. 5 is a sectional side view of the spat provided to the vehicle lower structure as shown in FIG. 4 when the spat collides with a curbstone and becomes elastically deformed.

With reference to FIG. 4 and FIG. 5, the second embodiment of the vehicle lower structure according to the present disclosure will be described, hereinafter. In the second embodiment, the same reference numerals are used for components, members, and others that are common to the first embodiment, and detailed description thereof will be omitted.

FIG. 4 is a perspective view showing a vehicle lower structure S50 of the present embodiment as viewed from the vehicle-rearward direction with the undercover 30 not shown. As shown in FIG. 4, in the vehicle lower structure S50, instead of the spats 46 (see FIG. 1) of the vehicle lower structure S10 of the first embodiment, there are provided spats 52 configured as separate members from the duct 44. A front wall 52A and a rear wall 52B of each spat 52 are composed of elastically deformable platy members. In the present embodiment, the front wall 52A and the rear wall 52B of each spat 52 are composed of an elastically deformable material such as elastomer resin, for example. Through holes 54 through which fasteners such as bolts can be inserted are formed in respective upper parts of the front wall 52A and the rear wall 52B of the spat 52. The rear wall 52B of the spat 52 is fixed to a rear lower end of the upper wall 44A of the duct 44 by fasteners such as bolts. The front wall 52A of the spat 52 is fixed to a front lower end of the lower wall 44B of the duct 44 by fasteners such as bolts. In the present embodiment, although not shown in the drawing, it is configured that the rear wall 52B is held between an edge (end wall) of the air outlet 42 (see FIG. 5) of the undercover 30 and the upper wall 44A of the duct 44, and it is also configured that the front wall 52A is held between the edge (end wall) of the air outlet 42 of the undercover 30 and the lower wall 44B of the duct 44.

In such a vehicle lower structure S50, each spat 52 is composed of an elastic platy member that is elastically deformable, and is fixed as a separate member to each corresponding duct 44. The spat 52 is provided with the front wall 52A and the rear wall 52B, and is configured to open at both the sides of the air outlet 42 in the vehicle-width direction. Through this, as shown in FIG. 5, for example, when the spat 52 collides with projections 56 such as curbstones, the front wall 52A and the rear wall 52B are elastically deformed so that the front wall 52A and the rear wall 52B easily return to original shapes thereof, thus suppressing breakage of the spat 52. Accordingly, the positions of the front wall 52A and the rear wall 52B can be lowered toward the vehicle-downward direction, and thus it is possible to bring the air to blow from the air outlet 42 farther toward the downward direction. In FIG. 5, for easier understanding of the spat 52 in a deformed state, the spat 52 and the duct 44 are integrally illustrated.

In the present embodiment, the front wall 52A and the rear wall 52B of each spat 52 are fixed to each corresponding duct 44, but the present disclosure is not limited to this configuration. For example, it may be configured to bend the upper part of the front wall 52A of the spat 52 toward the vehicle-frontward direction and fix the front wall 52A to a lower face of the undercover 30. In addition, it may be configured to bend the upper part of the rear wall 52B of the spat 52 toward the vehicle-rearward direction and fix the rear wall 52B to the lower face of the undercover 30. It may also be configured to integrally form the undercover and each spat, and compose them all of an elastic member, or the like.

[Third Embodiment]

Figure 6:
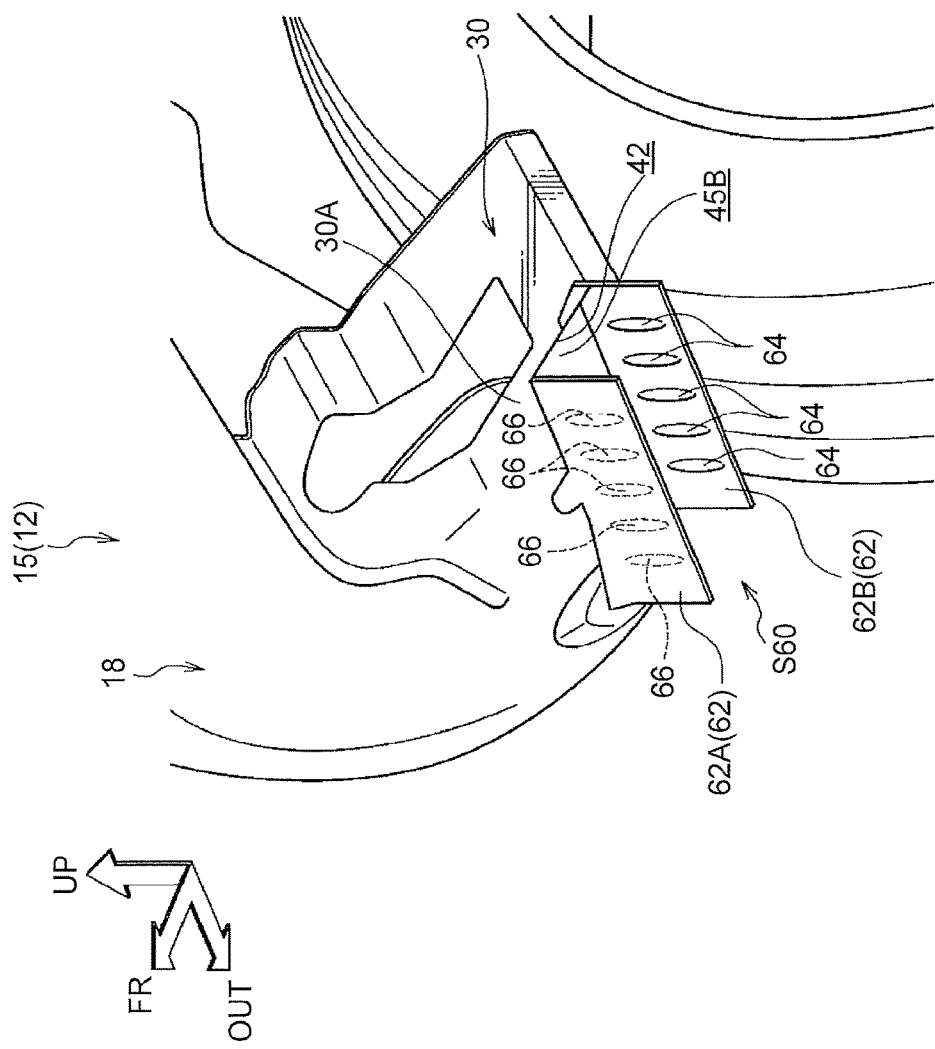
FIG. 6 is a perspective view showing the duct provided to a vehicle lower structure according to a third embodiment, as viewed from the obliquely front lower direction of the vehicle.

With reference to FIG. 6, the third embodiment of the vehicle lower structure according to the present disclosure will be described, hereinafter. In the third embodiment, the same reference numerals are used for components, members, and others that are common to the first and the second embodiments, and detailed description thereof will be omitted.

FIG. 6 is a perspective view showing a vehicle lower structure S60 of the present embodiment as viewed from the obliquely front lower direction of the vehicle. As shown in FIG. 6, the vehicle lower structure S60 is provided with spats 62, each including a front wall 62A and a rear wall 62B at the front and the back of each air outlet 42 in the vehicle-longitudinal direction in the undercover 30. The rear wall 62B of each spat 62 is provided with multiple projections 64 that are arranged along the vehicle-vertical direction and project toward the vehicle-frontward direction. In other words, the multiple projections 64 are configured to project toward the inside of the air outlet 42 in a vehicle plan view. The multiple projections 64 are arranged with intervals in the vehicle-width direction in a substantially horizontal manner.

In the vehicle lower structure S60, the rear wall 62B of the spat 62 is provided with the multiple projections 64 that are arranged along the vehicle-vertical direction, and projecting toward the vehicle-frontward direction; thus, when the air blows downward from the air outlet 42, the multiple projections 64 cause longitudinal vortexes (vortexes whirling toward the vehicle-downward direction) among multiple adjacent projections 64. Hence, by adding a longitudinal vortex component having a high straightness to the downward air flow, it is possible to bring the air to blow from the air outlet 42 farther toward the vehicle-downward direction.

As a variation of the vehicle lower structure S60, as shown in FIG. 6, only the front wall 62A of each spat 62 may be provided with multiple projections 66 that are arranged along the vehicle-vertical direction and project toward the vehicle-rearward direction. In other words, the multiple projections 66 are configured to project toward the inside of the air outlet 42 in the vehicle plan view. Through this, when the air blows downward from the air outlet 42, the multiple projections 66 of the front wall 62A cause longitudinal vortexes (vortexes whirling toward the vehicle-downward direction) among multiple adjacent projections 66. Hence, by adding a longitudinal vortex component having a high straightness to the downward air flow, it is possible to bring the air to blow from the air outlet 42 farther toward the vehicle-downward direction.

As another variation of the vehicle lower structure S60, as shown in FIG. 6, both the front wall 62A and the rear wall 62B of each spat 62 may be provided with the multiple projections 64, 66. That is, the front wall 62A of the spat 62 may be provided with the multiple projections 66 and the rear wall 62B thereof may be provided with the multiple projections 64 as well. With this, when the air blows downward from the air outlet 42, the multiple projections 64, 66 cause longitudinal vortexes (vortexes whirling toward the vehicle-downward direction) among multiple adjacent projections 64 and among multiple adjacent projections 66. Accordingly, by adding the longitudinal vortex component having a high straightness to the downward air flow, it is possible to bring the air to blow from the air outlet 42 farther toward the vehicle-downward direction.

A shape and a length of each of the multiple projections provided to the front wall 62A and the rear wall 62B are not limited to the shape and the length of each of the multiple projections 64, 66 of the third embodiment, but may be changed. In the aforementioned embodiment, the multiple projections 64, 66 are configured to project toward the inside of the air outlet 42 in the vehicle plan view, but the present disclosure is not limited to this configuration. For example, the front wall 62A and the rear wall 62B may be provided with multiple projections that are arranged along the vehicle-vertical direction and project toward the outside (opposite to the inside) of the air outlet 42 in the vehicle plan view.

[Fourth Embodiment]

Next, with reference to FIG. 7 to FIG. 9, the fourth embodiment of the vehicle lower structure according to the present disclosure will be described, hereinafter. In the fourth embodiment, the same reference numerals are used for components, members, and others that are common to the first to the third embodiments, and detailed description thereof will be omitted.

Figure 7:
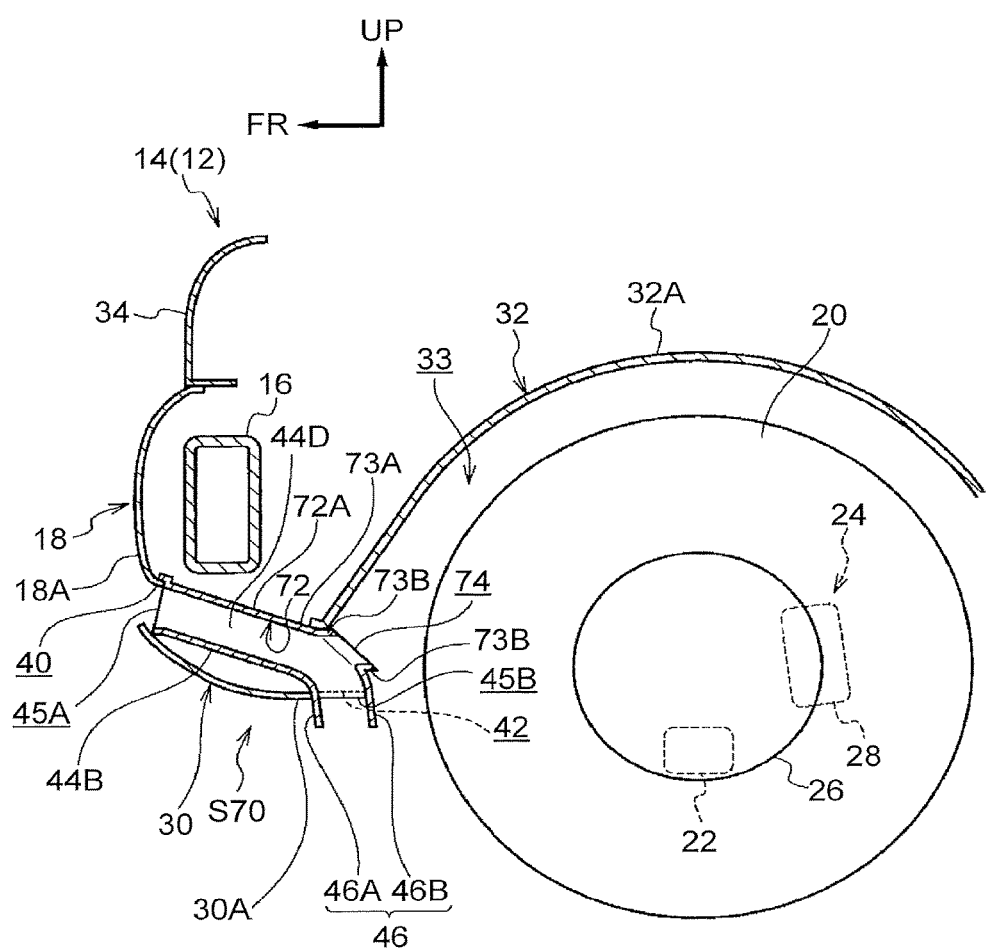
FIG. 7 is a sectional side view showing a vehicle lower structure according to a fourth embodiment.
Figure 8:
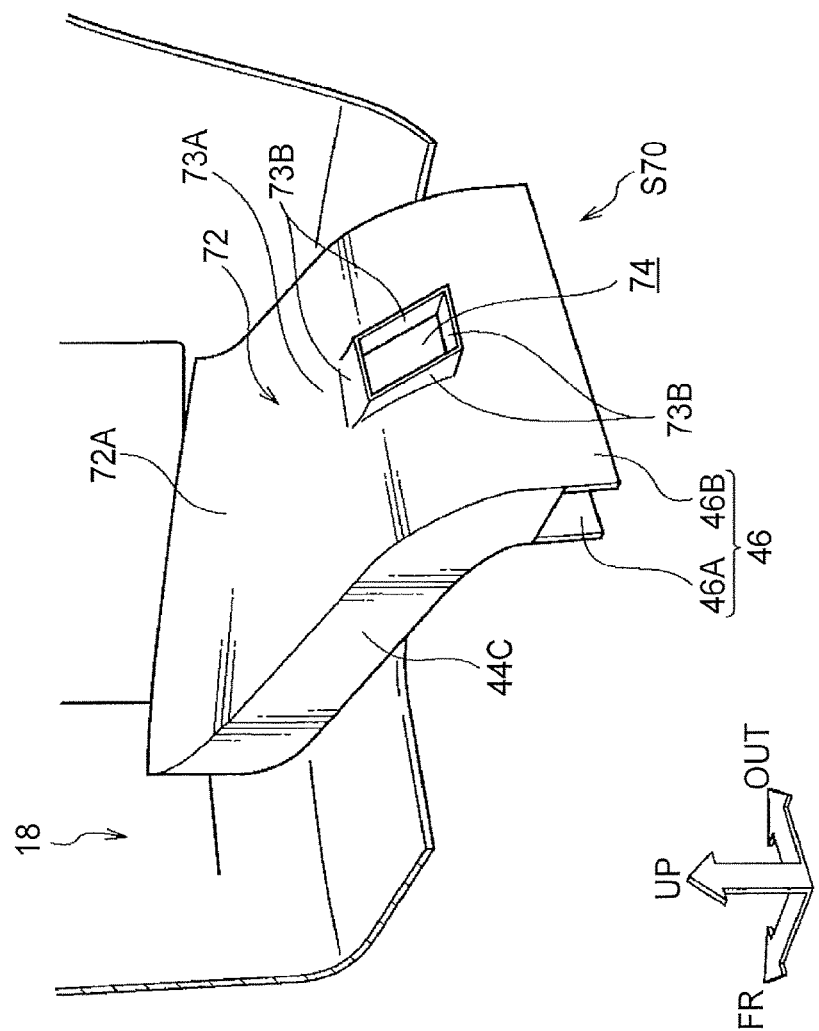
FIG. 8 is a partially-broken perspective view showing a duct and a spat provided to the vehicle lower structure in FIG. 7, as viewed from the vehicle rearward direction.

As shown in FIG. 7 and FIG. 8, a vehicle lower structure S70 of the present embodiment is provided with ducts 72 each of which connects the introducing port 40 of the bumper cover 18 and the air outlet 42 of the undercover 30. Each duct 72 is provided with an upper wall 72A composing an upper part in the vehicle-vertical direction of a substantially rectangular cylinder shape of the duct 72. A rear end part of the upper wall 72A in the vehicle-longitudinal direction is curved in the vehicle-downward direction toward the air outlet 42, and an aperture 74 is formed in this curved part.

As shown in FIG. 7, the aperture 74 of the duct 72 is disposed frontward of the brake caliper 28 in the vehicle-longitudinal direction composing the brake device 24. In other words, the aperture 74 of the duct 72 is arranged at a position where the air is exhausted toward the brake caliper 28 located at a vehicle-rearward position. The aperture 74 is formed in a substantially rectangular shape in a vehicle back view (see FIG. 8). On the upper wall 72A, a frame portion 73B bent from a wall surface 73A of the upper wall 72A toward the vehicle-rearward direction is provided around the aperture 74 (see FIG. 8).

As shown in FIG. 9, as similar to the vehicle lower structure S10 of the first embodiment (see FIG. 3), the air introduced from the introducing port 40 of the bumper cover 18 flows through the duct 72, and is then exhausted from the air outlet 42 toward the vehicle-downward direction. In addition, in the vehicle lower structure S70 of the present embodiment, in the middle (a rear part in the vehicle-longitudinal direction) of each duct 72, part of the air in the duct 72 is exhausted from the aperture 74 toward the brake caliper 28 located at a vehicle-rearward position. Through this, it is possible to send the air from the aperture 74 toward the brake caliper 28 located at the vehicle-rearward position while suppressing collision of the air with the suspension arm 22. Therefore, a contact part between the brake device 24, that is, the brake caliper 28 and the disk rotor 26 can be cooled by the air exhausted from the aperture 74 (see FIG. 7). It is also possible to send the air to the brake device 24 without providing the bumper cover 18 with a new air inlet; therefore, the bumper cover 18 can be designed to be simpler.

[Variation]

Figure 10A:
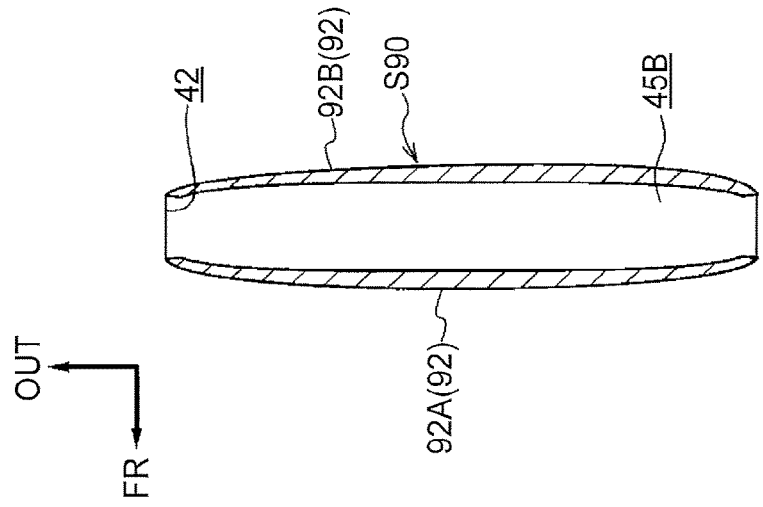
FIG. 10A is a sectional plan view of a spat provided to a vehicle lower structure of a first variation.

FIG. 10A is a sectional plan view showing each spat 82 provided to a vehicle lower structure S80 of the first variation. In each of the first to the fourth embodiments, the spat includes the front wall in a platy shape and the rear wall in a platy shape, but the spat 82 is provided with a front wall 82A formed such that an intermediate part thereof in the vehicle-width direction is curved toward the vehicle-frontward direction. The spat 82 is also provided with a rear wall 82B formed such that an intermediate part thereof in the vehicle-width direction is curved toward the vehicle-frontward direction. In the vehicle lower structure S80 including such spats 82, it is also possible to guide the air blowing from the air outlets 42 toward the vehicle-downward direction.

Figure 10B:
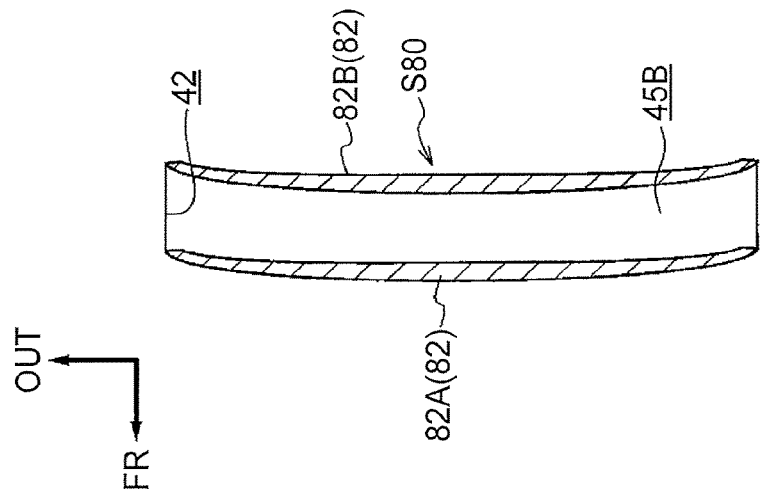
FIG. 10B is a sectional plan view of a spat provided to a vehicle lower structure of a second variation.

FIG. 10B is a sectional plan view showing each spat 92 provided to a vehicle lower structure S90 of the second variation. As shown in FIG. 10B, the spat 92 is provided with a front wall 92A formed such that an intermediate part thereof in the vehicle-width direction is curved toward the vehicle-frontward direction. The spat 92 is also provided with a rear wall 92B formed such that an intermediate part thereof in the vehicle-width direction is curved toward the vehicle-rearward direction. In the vehicle lower structure S90 including such spats 92, it is also possible to guide the air blowing from the air outlets 42 toward the vehicle-downward direction.

[Fifth Embodiment]

Next, with reference to FIG. 11, the fifth embodiment of the vehicle lower structure according to the present disclosure will be described, hereinafter. In the fifth embodiment, the same reference numerals are used for components, members, and others that are common to the first to the fourth embodiments, and detailed description thereof will be omitted.

As shown in FIG. 11, in a vehicle lower structure S100 of the present embodiment, a radiator 102 is incorporated at a position near the air outlet 42 inside the duct 44. The radiator 102 is fixed to an inner wall of the duct 44 with not-shown fixing tools. In this vehicle lower structure S100, a cooling water inside the radiator 102 can be cooled by the air introduced from the introducing port 40 and flowing through the duct 44.

[Sixth Embodiment]

Next, with reference to FIG. 12, the sixth embodiment of the vehicle lower structure according to the present disclosure will be described, hereinafter. In the sixth embodiment, the same reference numerals are used for components, members, and others that are common to the first to the fifth embodiments, and detailed description thereof will be omitted.

Figure 12:
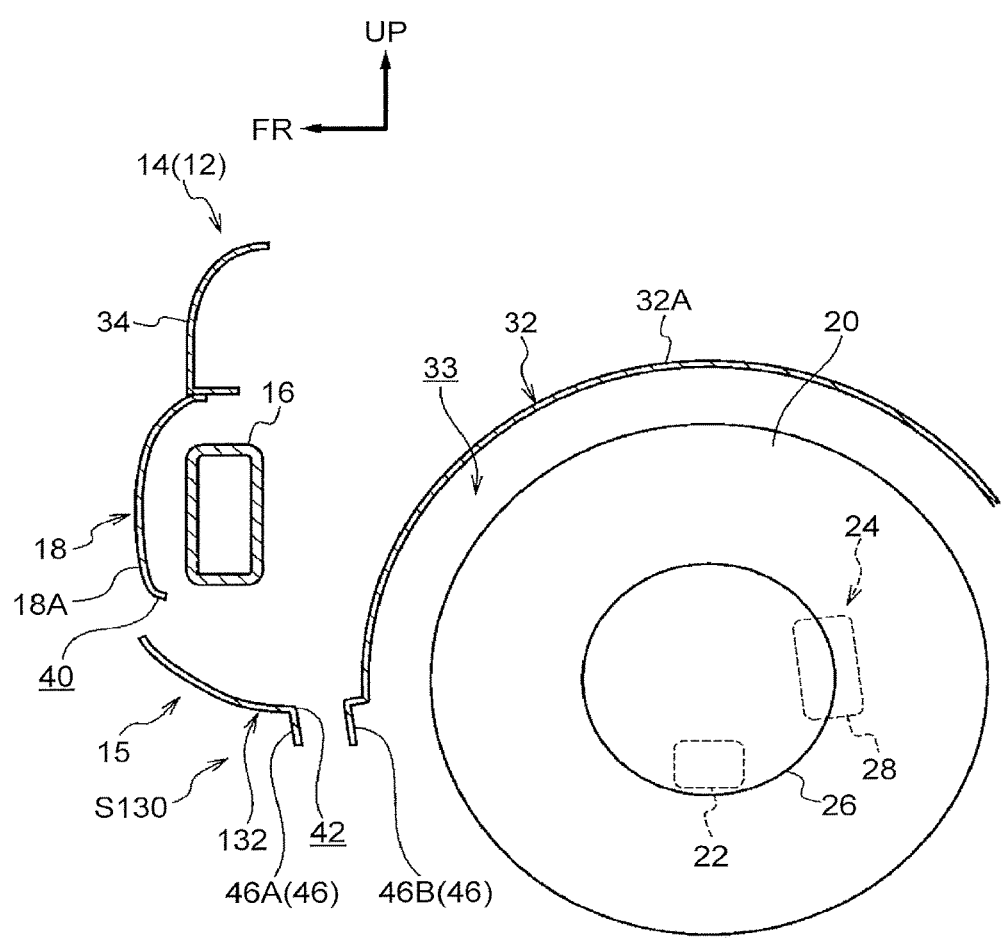
FIG. 12 is a sectional side view showing a vehicle lower structure according to a sixth embodiment.

As shown in FIG. 12, in a vehicle lower structure S130 of the present embodiment, introducing ports 40 are provided to the bumper cover 18 as the front part of the vehicle. An undercover 132 made of resin and composing the underfloor is provided downward in the vehicle-vertical direction of the bumper cover 18, and the undercover 132 is provided with the air outlets 42. The undercover 132 is provided with the spats 46 each of which includes the front wall 46A protruding from the front edge of the air outlet 42 toward the vehicle-downward direction, and the rear wall 46B protruding from the rear edge of the air outlet 42 toward the vehicle-downward direction. Each spat 46 is configured to open at both the sides of the air outlet 42 in the vehicle-width direction. In the present embodiment, the undercover 132 and the spats 46 are configured to be integrated with each other. In the vehicle lower structure S130, each introducing port 40 and each air outlet 42 are not connected by the duct.

In the present embodiment, a rear end of the undercover 132 is configured to be integrally continued to a front end of the fender liner 32, but the undercover 132 may be configured as a separate member from the fender liner 32, and the rear end of the undercover 132 and the front end of the fender liner 32 may be joined to each other.

In the vehicle lower structure S130, the air is introduced from each introducing port 40 of the bumper cover 18, and the air blows toward the vehicle-downward direction from each air outlet 42 of the undercover 132 composing the underfloor. At this time, the air flow blowing from the air outlet 42 becomes easier to flow along the front wall 46A at the front of the air outlet 42 and the rear wall 46B at the back of the air outlet 42 toward the vehicle-downward direction. The front wall 46A at the front of the air outlet 42 suppresses disturbance of the air flow blowing from the air outlet 42, which is caused by the air flow flowing from frontward of the vehicle 12. In addition, since both the sides of the air outlet 42 of each spat 46 in the vehicle-width direction are opened, it is possible to efficiently guide the air blowing from the air outlet 42 toward the vehicle-downward direction. Accordingly, in the configuration in which each introducing port 40 and each air outlet 42 are not connected by the duct, it is also possible to efficiently guide the air blowing from the air outlet 42 toward the vehicle-downward direction.

[Seventh Embodiment]

Next, with reference to FIG. 13, the seventh embodiment of the vehicle lower structure according to the present disclosure will be described, hereinafter. In the seventh embodiment, the same reference numerals are used for components, members, and others that are common to the first to the sixth embodiments, and detailed description thereof will be omitted.

Figure 13:
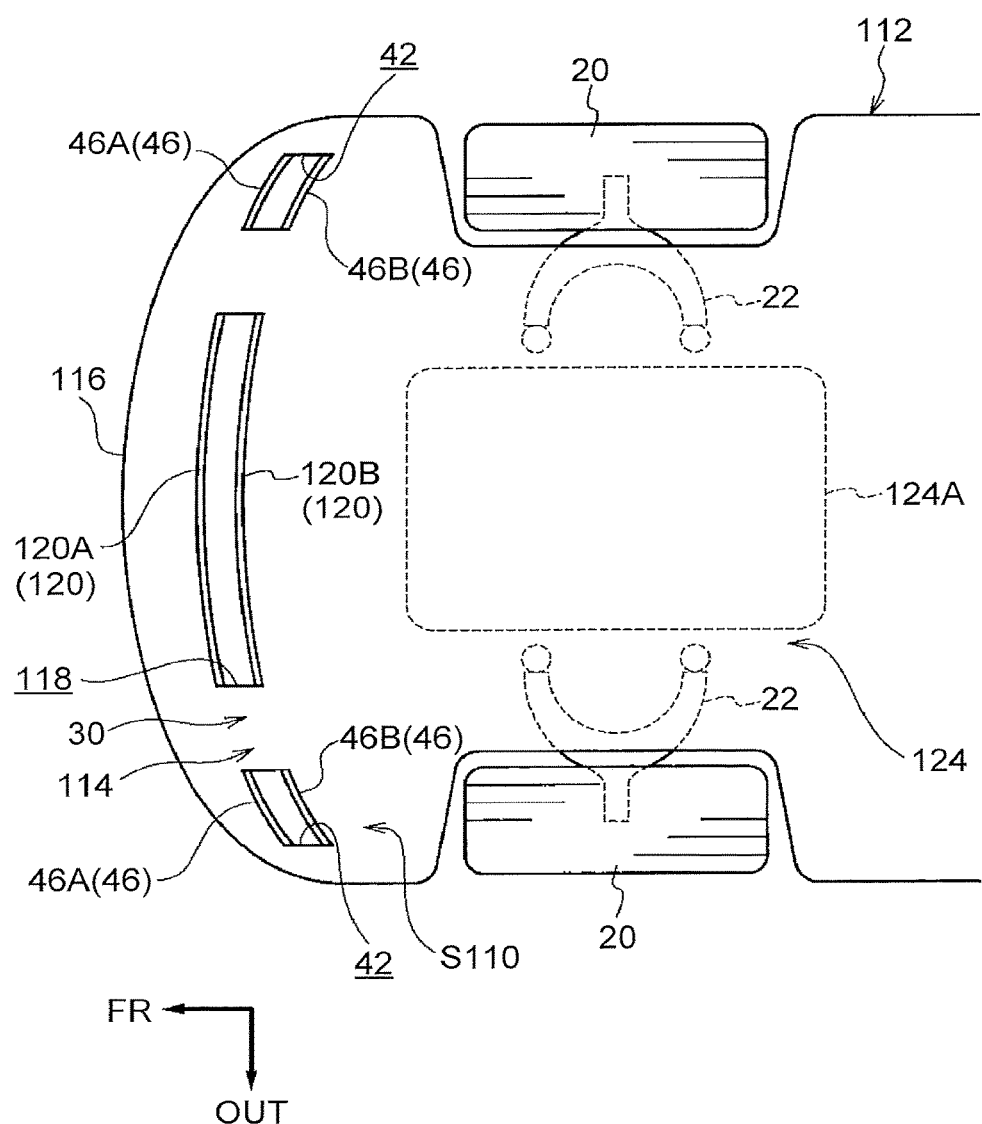
FIG. 13 is a bottom view showing a vehicle lower structure according to a seventh embodiment.

FIG. 13 is a bottom view showing a vehicle 112 including a vehicle lower structure S110 of the present embodiment. As shown in FIG. 13, the undercover 30 composing the floor is disposed to a lower part 114 of the vehicle 112, and both ends of the undercover 30 in the vehicle-width direction are provided with the air outlets 42. Each spat 46 including the front wall 46A and the rear wall 46B is provided at the front and the back of each air outlet 42 in the vehicle-longitudinal direction in the undercover 30. In the vehicle lower structure S110, an air outlet 118 is also provided to an intermediate part in the vehicle-width direction in the undercover 30. It is configured that a not-shown introducing port is provided to an intermediate part (a center part) of a front face of a bumper cover 116 of the vehicle 112 in the vehicle-width direction, and the air introduced from the introducing port is exhausted from the air outlet 118.

A spat 120 including a front wall 120A protruding from a front edge of the air outlet 118 toward the vehicle-downward direction and a rear wall 120B protruding from a rear edge of the air outlet 118 toward the vehicle-downward direction is provided at the front and the back of the air outlet 118 in the vehicle-longitudinal direction in the undercover 30. The spat 120 is configured to open at both the sides of the air outlet 118 in the vehicle-width direction. The vehicle lower structure S110 of the present embodiment is applied to the vehicle 112, such as a sport utility vehicle (SUV), for example.

In this vehicle lower structure S110, the air introduced from the introducing port in the intermediate part (center part) in the width direction of the vehicle 112 is efficiently guided along the spat 120 toward the vehicle-downward direction when the air is exhausted from the air outlet 118. In this vehicle lower structure S110, if there are roughness of an engine, a transmission, and others in a region 124A of a floor 124 between the right and the left front wheels 20 of the vehicle 112, it is possible to suppress collision of the air exhausted from the air outlet 118 with the roughness in the region 124A located at a more vehicle-rearward position. In the vehicle lower structure S110, the air outlet 118 and the air outlets 42 on the right and the left are independently arranged from one another; but the present disclosure is not limited to this configuration, and for example, the air outlet 118 may be continued to the air outlets 42 on the right and the left.

In the first to the sixth embodiments, there are provided the spats protruding from the edges of the air outlets in the undercover toward the vehicle-downward direction; and an angle of each spat relative to a plane (imaginary plane) in the vehicle-vertical direction of the edge of the air outlet is not limited to the angle of each spat in the first to the sixth embodiments, but may be changed. For example, the angle of the spat relative to the plane (imaginary plane) in the vehicle-vertical direction of the edge of each air outlet may be changed in such a manner that the spat is inclined toward the vehicle-rearward direction within a range of not less than 0° to not more than 45°.

In addition, in the first and the third to the fifth embodiments, the front wall or the rear wall of each spat is integrated with the duct at the front or the rear edge of the air outlet in the undercover; but the present disclosure is not limited to this configuration. Specifically, in the present specification, "from the front edge of the air outlet in the vehicle-longitudinal direction" also includes the configuration of integrating the front wall with the duct at the front edge of the air outlet and the configuration of fixing the front wall to either the inside or the outside of the duct at the front edge of each air outlet, in addition to the configuration of fixing the front wall to the front edge of the air outlet integrally with or separately from the undercover. Similarly, "from the rear edge of the air outlet in the vehicle-longitudinal direction" in the present specification also includes the configuration of integrating the rear wall with the duct at the rear edge of the air outlet and the configuration of providing the rear wall to either the inside or the outside of the duct at the rear edge of the air outlet, in addition to the configuration of fixing the rear wall to the rear edge of the air outlet integrally with or separately from the undercover.

It may be configured to appropriately combine the vehicle lower structures of the first to the sixth embodiments. For example, in the vehicle lower structure of the second embodiment, it may be configured to combine the spats 52 (see FIG. 4) composed of the elastic platy members with the spats 62 (see FIG. 6) including the projections 64, 66 of the third embodiment.

In addition, for example, the ducts 72 (see FIG. 7) of the fourth embodiment are provided with the spats 46, but instead of the spats 46, the ducts 72 may be provided with the spats 52 (see FIG. 4) of the second embodiment or the spats 62 (see FIG. 6) of the third embodiment; alternatively, it may be configured to combine the spats 52 (see FIG. 4) of the second embodiment and the spats 62 (see FIG. 6) of the third embodiment.

Furthermore, in the vehicle lower structure of the sixth embodiment (see FIG. 12), it may be configured to combine the spats 52 (see FIG. 4) composed of the elastic platy members of the second embodiment, the spats 62 (see FIG. 6) including the projections 64, 66 of the third embodiment, and others.

In each of the vehicle lower structures of the first to the fifth and the seventh embodiments, the introducing port is provided at the front of the duct in the front face of the bumper cover, but the present disclosure is not limited to this configuration. For example, it may be configured to provide the introducing port to either or both of the side walls 44C, 44D on both the sides of the duct in the vehicle-width direction.

Although examples have been provided above to explain exemplary embodiments of the present disclosure, these are merely examples of embodiments, and various modifications may be made within a range not departing from the spirit of the present disclosure. Moreover, it is needless to mention that the scope the present disclosure is not limited to these exemplary embodiments, and may be implemented in various embodiments without departing from the scope of the present disclosure.

What is claimed is:

1. A vehicle lower structure comprising:
   an introducing port into which air is introduced, the introducing port being provided to a front part of a vehicle;
   an air outlet from which the air blows, the air outlet being provided to an underfloor downward of a bumper cover in a vehicle-vertical direction, the bumper cover being located at the front part of the vehicle; and
   a spat provided frontward in a vehicle-longitudinal direction of a front wheel, the spat including:
      a front wall protruding from a front edge of the air outlet in the vehicle-longitudinal direction toward a vehicle-downward direction in the vehicle-vertical direction; and
      a rear wall protruding from a rear edge of air outlet in the vehicle-longitudinal direction toward the vehicle-downward direction,
   wherein the spat opens at both sides of the air outlet in a vehicle-width direction, and
   wherein at least one of the front wall and the rear wall has a longitudinal direction thereof in the vehicle-vertical direction, and includes multiple projections projecting toward an inside of the air outlet in a vehicle plan view.

2. The vehicle lower structure according to claim 1, wherein
   the spat is composed of an elastic platy member that is elastically deformable.

3. The vehicle lower structure according to claim 1, further comprising:
   a duct which connects the introducing port and the air outlet.

4. The vehicle lower structure according to claim 3, wherein
   a wall part located at a rearward position of the duct in the vehicle-longitudinal direction is provided with an aperture arranged frontward in the vehicle-longitudinal direction of a brake device of the front wheel, the aperture being configured to exhaust the air in the duct toward the brake device.

5. The vehicle lower structure according to claim 1, wherein
   the air outlet is provided to an undercover disposed downward of the bumper cover in the vehicle-vertical direction in such a manner as to open downward in the vehicle-vertical direction.

6. The vehicle lower structure according to claim 5, wherein the spat is integrated with the undercover.

7. The vehicle lower structure according to claim 3, further comprising:
   a radiator provided in the duct.

8. The vehicle lower structure according to claim 1, wherein
   the front wall and the rear wall are inclined relative to the vehicle-vertical direction toward a vehicle-rearward direction within a range of not less than 0° to not more than 45°.

9. A vehicle lower structure comprising:
   an introducing port opening toward a vehicle-frontward direction in a bumper cover provided to a front part of a vehicle;
   an air outlet opening downward in a vehicle-vertical direction in an undercover disposed downward in the vehicle-vertical direction of the bumper cover; and
   a spat protruding downward in the vehicle-vertical direction from the air outlet, the spat including a front wall protruding from a front edge of the air outlet in a vehicle-longitudinal direction toward a vehicle-downward direction in the vehicle-vertical direction and a rear wall protruding from a rear edge of the air outlet in the vehicle-longitudinal direction toward the vehicle-downward direction, and the spat being configured to open at both sides of the air outlet in a vehicle-width direction,
   wherein at least one of the front wall and the rear wall has a longitudinal direction thereof in the vehicle-vertical direction, and includes multiple projections projecting toward an inside of the air outlet in a vehicle plan view.

10. The vehicle lower structure according to claim 9, further comprising:
    a duct which connects the introducing port and the air outlet, a wall part of the duct located at a rearward position in the vehicle-longitudinal direction being provided with an aperture arranged frontward of a brake device of a front wheel in the vehicle-longitudinal direction.

* * * * *